United States Patent

Ichikawa

(10) Patent No.: US 9,609,167 B2
(45) Date of Patent: Mar. 28, 2017

(54) IMAGING DEVICE CAPABLE OF TEMPORARILY STORING A PLURALITY OF IMAGE DATA, AND CONTROL METHOD FOR AN IMAGING DEVICE

(71) Applicant: Olympus Corporation, Hachioji, Tokyo (JP)

(72) Inventor: Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/627,654

(22) Filed: Feb. 20, 2015

(65) Prior Publication Data

US 2015/0264219 A1 Sep. 17, 2015

(30) Foreign Application Priority Data

Mar. 13, 2014 (JP) .................................. 2014-049960

(51) Int. Cl.
  H04N 1/21 (2006.01)
  H04N 5/77 (2006.01)
  H04N 9/804 (2006.01)
  H04N 5/232 (2006.01)

(52) U.S. Cl.
  CPC .......... H04N 1/2137 (2013.01); H04N 5/772 (2013.01); H04N 9/8042 (2013.01); H04N 5/23245 (2013.01); H04N 2201/218 (2013.01)

(58) Field of Classification Search
  CPC .. H04N 5/772; H04N 1/2137; H04N 5/23245; H04N 1/2129; G06F 21/6209
  See application file for complete search history.

(56) References Cited

U.S. PATENT DOCUMENTS

| 7,353,324 | B2 | 4/2008 | Tanaka | |
|---|---|---|---|---|
| 7,738,731 | B2 | 6/2010 | Aiso | |
| 8,023,000 | B2 | 9/2011 | Tamaru | |
| 8,576,295 | B2 | 11/2013 | Ito | |
| 2004/0252206 | A1* | 12/2004 | Tsumura | H04N 5/772 348/231.99 |
| 2006/0126469 | A1* | 6/2006 | Urushibara | G06F 3/0607 369/53.2 |
| 2006/0268124 | A1* | 11/2006 | Fishman | H04N 1/2137 348/231.99 |
| 2008/0244737 | A1* | 10/2008 | Hayasaka | G06F 21/6209 726/21 |
| 2009/0021594 | A1* | 1/2009 | Tsuda | H04N 5/235 348/222.1 |
| 2012/0086830 | A1* | 4/2012 | Ichikawa | H04N 9/735 348/223.1 |

(Continued)

*Primary Examiner* — Abdelaaziz Tissire

(74) *Attorney, Agent, or Firm* — John C. Pokotylo; Straub & Pokotylo

(57) ABSTRACT

An imaging device of the present invention comprises an image data acquisition circuit for acquiring image data, a temporary storage for temporarily storing the image data, an image processing circuit for subjecting the image data that has been temporarily stored to image processing, a storage medium that can store at least some saved data of the image data that has been temporarily stored, a management information storage for storing management information for managing the save data, and a control circuit for, when the saved data is stored in the storage medium, carrying out management of the saved data using the management information.

12 Claims, 11 Drawing Sheets

(56) References Cited

U.S. PATENT DOCUMENTS

2012/0154609 A1* 6/2012 Ozaki .................... H04N 5/765
　　　　　　　　　　　　　　　　　　　　　　　348/207.99
2012/0262603 A1* 10/2012 Chen ...................... H04N 5/772
　　　　　　　　　　　　　　　　　　　　　　　348/231.99

* cited by examiner

IMAGING DEVICE CAPABLE OF TEMPORARILY STORING A PLURALITY OF IMAGE DATA, AND CONTROL METHOD FOR AN IMAGING DEVICE

Benefit is claimed, under 35 U.S.C. §119, to the filing date of prior Japanese Patent Application No. 2014-049960 filed on Mar. 13, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device and imaging method for temporarily storing a plurality of image data at the time of image processing, and carrying out image processing using this temporarily stored image data.

2. Description of the Related Art

With an imaging device such as a digital camera, a plurality of images are taken, and the imaging device may be provided with an image processing function for realizing image quality that can not be expressed with a single image. For example, in Japanese Patent laid-open No. 2008-271240 (hereafter referred to as patent publication 1) there is proposed an imaging device in which by carrying out image combination by carrying out positional alignment of a subject using a plurality of image data that have been acquired by moving focus position, all-in-focus images and blur-controlled image are generated.

Also, Japanese patent laid-open No. 2011-004353 (hereafter referred to as patent publication 2) proposes HDR (High Dynamic Range) effect technology for reproducing gradation characteristics that cannot be reproduced with a single image, by shooting a plurality of images of differing gradation and combining the plurality of images. Japanese patent laid-open No. 4325625 (hereafter referred to as patent publication 3) proposes technology for generating an image of higher resolution than an original image by combining a plurality of images.

Also, with an imaging device such as a digital camera, image files are stored in a non-volatile memory such as flash memory. In the event that data is stored in flash memory, it is common practice to write data in cluster units, and to store in a table (hereafter referred to as FAT (File Allocation Table)) for managing in which cluster data has been stored.

There is degradation in file rewrite performance due to frequent reading and writing of the FAT and directory information for managing data stored in the flash memory accompanying change in the files. It has therefore been proposed, in Japanese patent laid-open No. 2005-108304 (hereafter referred to as patent publication 4) to prevent reduction in speed due to degradation using different type of non-volatile memory for storing management information.

SUMMARY OF THE INVENTION

In the case of combining images, in general the more images that are used in the combination the better the results that are obtained. It is therefore preferable to use as many taken images as possible from the viewpoint of image quality. On the other hand, volatile memory for temporary storage installed in an image device such as a digital camera (for example, SDRAM (Synchronous Dynamic Random Access Memory)) has a limited capacity that can be installed due to restraints such as mounting pace and product cost, which means that the number of images that can be simultaneously stored is limited.

It has therefore been considered to utilize technology that saves data by temporarily storing as files to a non-volatile storage medium that has a lower transfer speed than SDRAM but is large capacity, and reads files again at the time of required processing. However, if data is stored as files to a non-volatile storage medium, in cases where the imaging device closes down abnormally due to battery depletion etc., or cases where connection or communication between the storage medium and the imaging device is interrupted, it is not possible to delete files that have been temporarily stored, which means they remain as files on the storage medium, and a region for storing taken images is reduced.

An object of the present invention is to provide an imaging device and an imaging method with which there is no effect on a region for storing taken images due to temporarily stored files being preserved, even in cases where the imaging device has been closed down abnormally or cases such as where connection or communication between a storage medium and the imaging device has been severed.

An imaging device of the present invention comprises an image data acquisition circuit for acquiring image data, a temporary memory for temporarily storing the image data, an image processing circuit for subjecting the image data that has been temporarily stored to image processing, a storage medium that can store at least some saved data of the image data that has been temporarily stored, a management information memory for storing management information for managing the saved data, and a control circuit for, when the saved data is stored in the storage medium, carrying out management of the saved data using the management information.

Further, an imaging device of the present invention comprises an imaging circuit for acquiring image data by forming an image of a subject, a memory for temporarily storing the image data, an image combining circuit for combining a plurality of image data and generating combined image data, a storage control circuit for controlling data storage, and a control circuit for controlling the imaging device, wherein the control circuit instructs the imaging circuit to consecutively acquire a plurality of image data, instructs the storage control circuit to store at least some of the plurality of image data using a first storage system, instructs the image combination circuit to combine the plurality of image data, and instructs the storage control circuit to store the image data that has been combined by the image combining circuit using a second storage system.

Also, an imaging method of the present invention comprises acquiring image data, temporarily storing the image data, saving at least some of the image data that has been temporarily stored as saved data, storing management information for managing the saved data, and when the saved data is stored in the storage medium, carrying out management of the saved data using the management information, and carrying out image processing using the saved data that has been saved.

DETAILED DESCRIPTION OF THE PREFERRED EMBODIMENTS

An example where a digital camera is adopted as one embodiment of the present invention will be described in the following. This digital camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a shutter release operation image data is stored in a storage medium. Image data that has been stored in the storage medium can be subjected to playback display on the display section if playback mode is selected.

Also, in summary, the digital camera of the first embodiment can control a FAT for data storage, and, in a memory (SDRAM) for temporary storage within the camera, can store at what position (which cluster etc.) in a storage medium save data has been stored. However, the position at which the save data has been stored (which cluster etc.) is not stored in the storage medium. It is therefore not possible to identify at what position (which cluster etc.) the save data has been stored from the FAT in the storage medium, and even if save data remains in the storage medium, in data management it is handled as saved data not being stored, and even in cases such as where the imaging device closes down abnormally, or cases where communication between the storage medium of the imaging device is interrupted, from a practical viewpoint there is no preservation of saved data (files).

Figure 1:
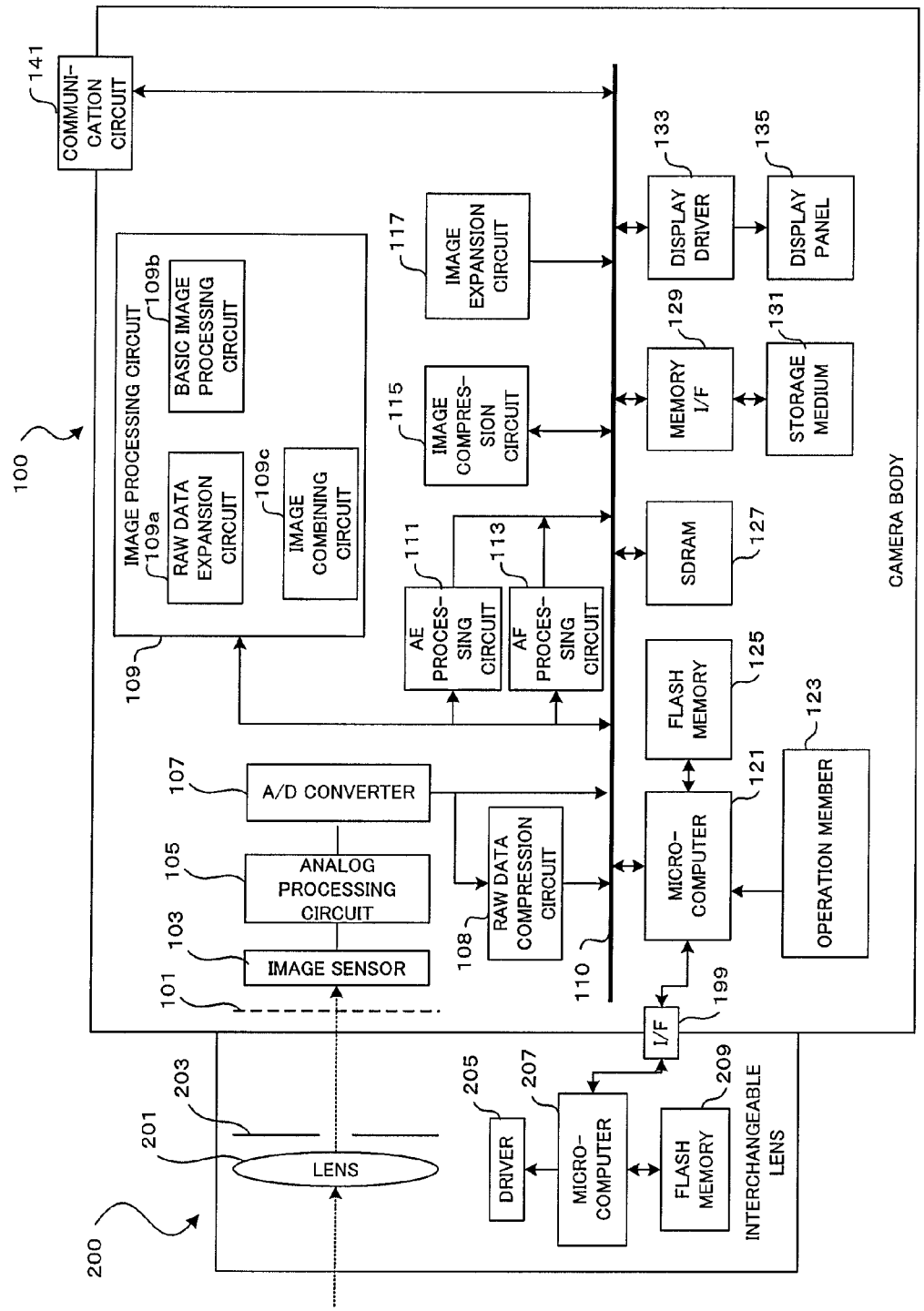
FIG. 1 is a block diagram mainly showing the electrical structure of a camera of a first embodiment of the present invention.

FIG. 1 is a block diagram mainly showing the electrical structure of a camera of a first embodiment of the present invention. This camera comprises a camera body 100 and an interchangeable lens 200 that can be attached to and removed from the camera body 100. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, a microcomputer 207 and a flash memory 209, and has an interface (hereafter referred to as I/F) 199 between the interchangeable lens 200 and the camera body 100, which will be described later.

The photographing lens 201 is constituted by a plurality of optical lenses for forming a subject image, and is a fixed focal length lens or a zoom lens. The diaphragm 203 is arranged to the rear on the optical axis of this photographing lens 201, and the diaphragm 203 has a variable aperture to control amount of subject light flux passing through the photographing lens 201. Also, the photographing lens 201 is capable of being moved in the optical axis direction by the driver 205, with focus position of the photographing lens 201 being controlled based on control signals from the microcomputer 207, and in the case where the photographing lens 201 is a zoom lens, focal length is also controlled. The driver 205 also controls aperture of the diaphragm 203.

The microcomputer 207 that is connected to the driver 205 is connected to the I/F 199 and the flash memory 209. The microcomputer 207 operates in accordance with program code stored in the flash memory 209, to perform communication with a microcomputer 121 within the camera body 100, which will be described later, and performs control of the interchangeable lens 200 based on control signals from the microcomputer 121.

Besides the previously described program code, various information such as optical characteristics of the interchangeable lens 200 and adjustment values are stored in the flash memory 209. The I/F 199 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted. Behind this mechanical shutter 101, an image sensor 103 is arranged at a position where the subject image is formed by the photographing lens 201.

The image sensor 103 functions as an imaging circuit, and has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 also has an electronic shutter. This electronic shutter carries out control of exposure time by controlling the time from charge storage until charge readout of the image sensor 103. The image sensor 103 is not limited to a Bayer array, and a layered type such as Foveon (Registered trademark), for example, can also be used.

The image sensor 103 is connected to an analog processing circuit 105, and this analog processing circuit 105 performs wave shaping on the photoelectric conversion signals (analog image signals) that have been read out from the image sensor 103 after reducing reset noise etc., and also carries out gain increase so as to achieve an appropriate brightness.

This analog processing circuit 105 is connected to an A/D converter 107, and this A/D converter 107 performs analog to digital conversion on the analog image signals, and outputs the digital image signals (hereafter referred to as image data) to a bus 110. In this application, raw image data before image processing in the image processing circuit 109 is called RAW data.

The A/D converter 107 is connected to a RAW data compression circuit 108, and this RAW data compression circuit 108 carries out compression of RAW data that has been output from the A/D converter 107, and is used at the time of incorporating RAW data other than for a base image. Abase image is an image that is made a base when combining a plurality of image data. The RAW data compression circuit 108 converts RAW data that has been subjected to A/D conversion to data of a smaller data amount than input data using a polygonal line or a table. Simple lower bit truncation or a conversion method of multiplying by a coefficient of less than 1 may be used, but taking into consideration gamma conversion for the image processing circuit 109, conversion using a polygonal line or a table can reduce image quality degradation.

The bus 110 is a transfer path for transferring various data that has been readout or generated inside the camera body 100, within the camera body 100. Besides the previously described A/D converter 107 and RAW data compression circuit 108, an image processing circuit 109, AE (Auto Exposure) processing circuit 111, AF (Auto Focus) processing circuit 113, image compression circuit 115, image expansion circuit 117, the microcomputer 121, an SDRAM 127, memory interface (hereafter referred to as memory I/F) 129, display driver 133 and communication circuit 141 are connected to the bus 110.

The image processing circuit 109 has a RAW data expansion circuit 109a for expanding RAW data that has been compressed, a basic image processing circuit 109b for carrying out normal image processing, and an image combining circuit 109c for carrying out image combining. The RAW data expansion circuit 109a, basic image processing circuit 109b and image combining circuit 109c are used in the case of combining a plurality of images.

Image data other than a base image is compressed by the RAW data compression circuit 108, and the RAW data expansion circuit 109a carries out expansion of the compressed RAW data. The RAW data expansion circuit 109a applies a reverse characteristic to that of the RAW data compression circuit 108 and converts to data that is similar to immediately after A/D conversion. If compression is lossless identical data is obtained, while with lossy compression similar data is converted to. Generally, data after 18 conversion has a linear characteristic with respect to exposure amount, and so compressed RAW data stored in the SDRAM is converted to linear RAW data.

The basic image processing circuit 109a performs optical black (OB) subtraction processing, white balance (WB) correction, demosaicing processing carried out in the case of Bayer data, color reproduction processing, gamma correction processing, color matrix computation, noise reduction (NR) processing, edge enhancement processing etc. on RAW data. In a single exposure, and if a special effect filter has not been set, image processing is completed with only processing by this basic image processing circuit 109a.

The image combining circuit 109c carries out various image combination in accordance with a combining mode that has been set etc. With this embodiment, it is possible to set three combination modes, namely HDR combination, focus stacking and super resolution combination. In the event that HDR combination mode has been set, the image combining circuit 109c generates an image having a wider dynamic range than a single image by carrying out combination of a plurality of image data that have been taken at a plurality of exposure amounts with positional alignment to a base image.

Also, in the event that focus stacking mode has been set, the image combining circuit 109c generates an image having a depth of field that is different to a single image, by carrying out combination of a plurality of image data that have been taken at a plurality of focus positions, with positional alignment to abase image. In the event that super resolution combination mode has been set, the image combining circuit 109c generates an image having a better resolution than a single image by carrying out combination of a plurality of image data with positional alignment to a base image.

The AE processing circuit 111 measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing circuit 113 extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method. With this embodiment AF control using a contrast method is given as an example, but it is also possible to carry out focusing by AF control using phase difference AF, where subject light flux is divided and phase difference sensors are provided on the optical paths, or a phase difference sensor is provided on an image sensor.

At the time of storage of image data to the storage medium 131, the image compression circuit 115 subjects image data that has been read out from the SDRAM 127 to compression in accordance with various compression formats such as JPEG compression in the case of a still picture or MPEG in the case of a movie.

The image expansion circuit 117 also carries out expansion of JPEG image data and MPEG image data for image playback display. In the expansion, a file that is stored in the storage medium 131 is read out, and after being subjected to expansion processing in the image expansion circuit 117 the expanded image data is temporarily stored in the SDRAM 127. With this embodiment, the JPEG compression system and/or MPEG compression system are adopted as the image compression system, but the compression system is not limited to this and another compression systems may be used, such as TIFF, H.264 etc. The compression system may also be lossless compression or lossy compression.

The microcomputer 121 provides a function as a control circuit for this entire camera, and performs overall control of various sequences of the camera in accordance with program code stored in the flash memory 125. Besides the previously described I/F 199 an operation member 123 and a flash memory 125 are connected to the microcomputer 121.

The operation member 123 includes operation members such as various input buttons, like a power supply button, shutter release button, a movie button, playback button, menu button, cross-shaped key, and OK button, and various input keys, and detects operating states of these operation members and outputs the result of detection to the microcomputer 121. The microcomputer 121 executes various sequences according to user operation based on the result of detection from the operation member 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The shutter release button has two switches. Specifically, the shutter release button has a first release switch that turns on when the button is pressed down half way, and a second release switch that is turned on when the button is pressed down further from the half-pressed state to be pressed down fully. The microcomputer 121 executes shooting preparation sequences such as an AE operation and AF operation if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The movie button is an operation button for designating start or finish of movie shooting, and if the movie button is initially operated movie shooting commences, and movie shooting finishes when it is operated again. The playback button is an operation button for setting and canceling playback mode settings, and if playback mode is set image data of a taken image is read out from the storage medium 131, and a taken image is playback displayed on the display panel 135.

The menu button is an operation button for causing display of menu screens on the display panel 135. It is possible to carry out the various camera settings on the menu screens. As camera settings there are, for example, combination modes such as HDR combination, focus stacking and super resolution combination.

The flash memory 125 is a non-volatile memory, and stores program code for executing various sequences for the microcomputer 121, and parameters for image processing such as white balance gain and color matrix etc. The microcomputer 121 carries out overall control of the camera based on this program code.

The SDRAM 127 is a volatile memory that can be electrically rewritten, for temporary storage of image data. This SDRAM 127 temporarily stores image data that has been output from the A/D converter 107, and image data that has been processed in the image processing circuit 109, image compression circuit 115 and image expansion circuit 117 etc.

The memory I/F 129 is connected to the storage medium 131, and carries out control for reading and writing of data, such as image data and header information attached to image data, to and from the storage medium 131. The storage medium 131 is a storage medium such as a memory card that can be loaded into and taken out of the camera body 100, but this is not limiting and it may also be a hard disk or the like built into the camera body 100.

The display driver 133 is connected to the display panel 135, and reads out from the SDRAM 127 and storage medium 131 to display an image on the display panel 135 based on image data that has been expanded by the image expansion circuit 117. The display panel 135 is arranged on a rear surface of the camera body 100, and carries out image display. Since the display panel 135 is arranged on a display surface of an external section of the camera, such as the rear surface, it is a display section that is prone to the effects of external light, but it is possible to install a large-sized display panel. As a display section it is possible to adopt various display panels such as a liquid crystal display panel (LCD, TFT), or organic EL etc.

As image display modes of the display panel 135, there are Quickview Display for displaying image data to be stored for only a short time immediately after being taken, playback display of image files for still images and movies that have been stored in the storage medium 131, and movie display such as live view display.

The communication circuit 141 carries out communication with external devices by wired communication using USB or LAN etc., or wireless communication, and transmits live view images, or playback images that have been read out from the storage medium 131, to an external display section such as a smart phone or television. The communication circuit 141 also carries out exchange of some or all of temporarily stored image data between storage media of external devices (such as, for example, memory of a PC, smartphone or server on a network) when carrying out image composition in the image combining circuit 109c using a plurality of images.

Next, processing of a main flow of the camera of this embodiment will be described using the flowcharts shown in FIG. 2 and FIG. 3. The flowcharts shown in FIG. 2, FIG. 3, and in FIG. 4, FIG. 5 and FIG. 10, which will be described later, are executed by the microcomputer 121 controlling each section in accordance with program code stored in the flash memory 125.

Figure 2:
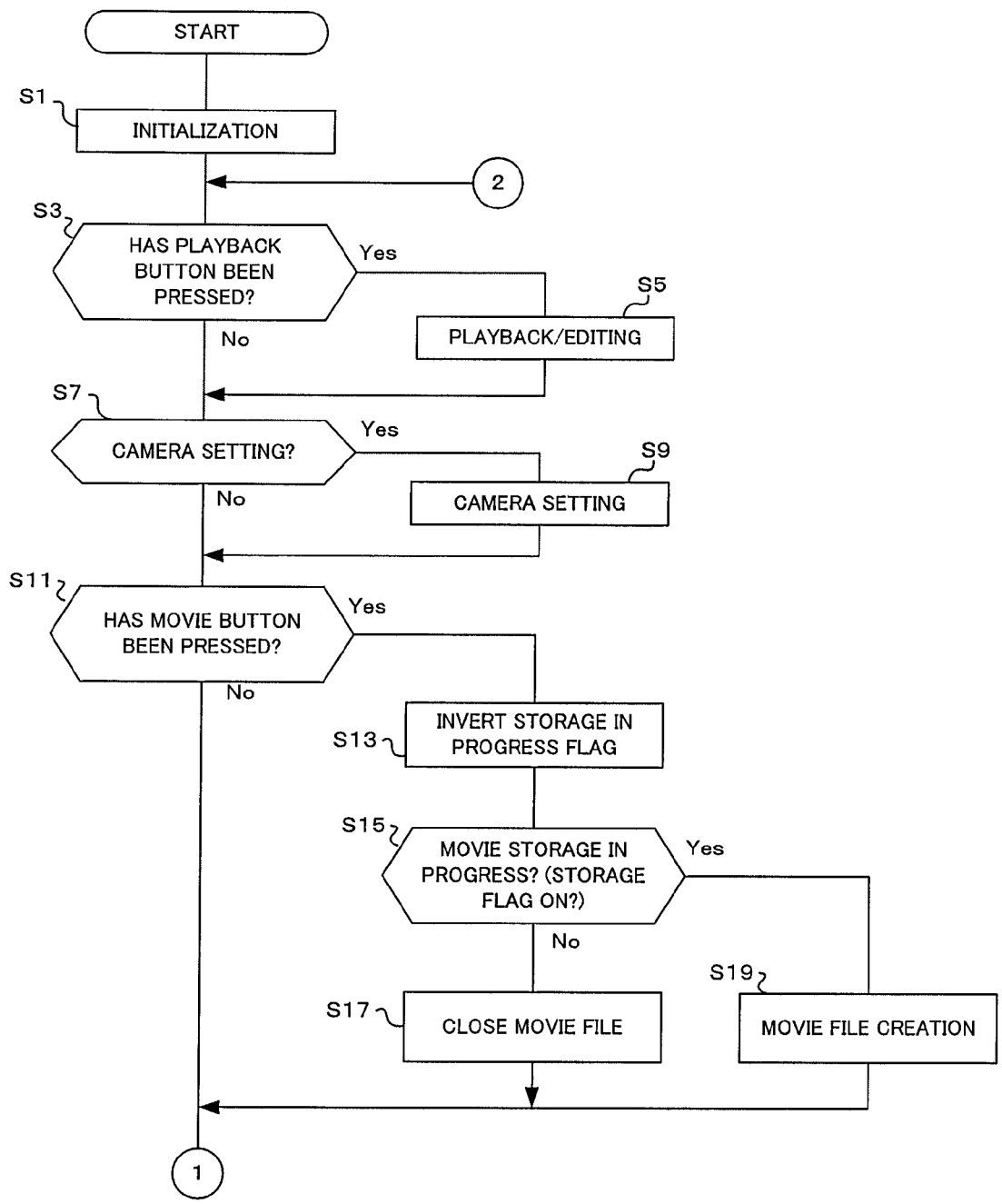
FIG. 2 is a flowchart showing main operation of the camera of the first embodiment of the present invention.
Figure 3:
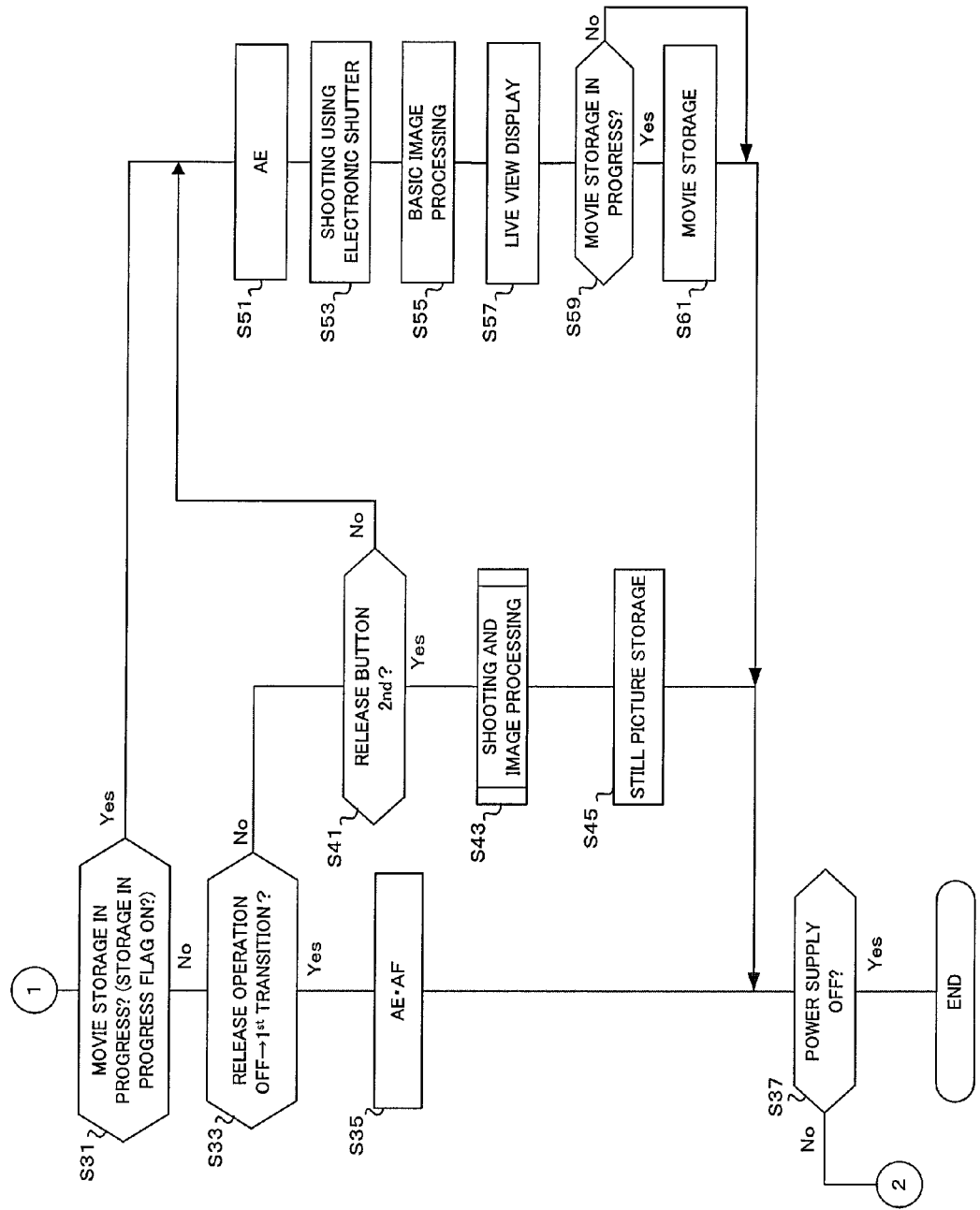
FIG. 3 is a flowchart showing main operation of the camera of the first embodiment of the present invention.

If the power supply button within the operation member 123 is operated and the power supply is turned on, the microcomputer 121 commences operation in accordance with the main flow shown in FIG. 2. Once operation has commenced, initialization is first executed (S1). As part of the initialization, mechanical initialization and electrical initialization, such as initialization of various flags etc., are carried out. As one of the various flags, a storage in progress flag indicating whether or not movie storage is in progress is reset to off (refer to steps S13, S15 and S31 etc.).

Once initialization has been carried out, it is next determined whether or not the playback button has been pressed (S3). Here, determination is carried out by detecting the operating state of the playback button within the operation member 123. If the result of this determination is that the playback button has been pressed, playback/editing mode is executed (S5). Here, image data is read out from the storage medium 131, and a table of still images and movies is displayed on the LCD 135. The user selects an image from within the table by operating the cross-shaped key and decides on the image using the OK button. It is also possible to carry out editing of a selected image.

If playback/editing is executed in step S5, or if the result of determination in step S3 was that the playback button had not been pressed, it is determined whether or not camera setting will be carried out (S7). When the menu button within the operation member 123 has been operated, camera setting is carried out on a menu screen. In this step it is therefore determined whether or not this menu button has been pressed.

If the result of determination in step S7 is that the menu button has been pressed, camera setting is carried out (S9). As described previously, it is possible to carry out various camera settings on the menu screens. As camera setting, as was described previously, it is possible to set modes, such as normal shooting, HDR combination, focus stacking, or super resolution combination, as shooting modes. It is also possible to set modes such as JPEG storage, TIFF storage, JPEG-RAW storage or RAW storage as still picture storage modes. It is possible to set modes such as motion JPEG storage or H.264 storage as the movie storage modes. It is possible to set modes such as fine or normal as image quality modes.

If camera setting has been carried out in step S9, or if the result of determination in step S7 was not camera setting, it is next determined whether or not the movie button has been pressed (S11). Here the microcomputer 121 carries out determination based on operating state of the movie button input from the operation member 123.

If the result of determination in step S11 is that the movie button has been pressed, inversion of the storage in progress flag is next carried out (S13). The storage in progress flag is set to on (1) if movie shooting is progress, or set to off (0) if a movie is not being shot. In this step the flag is inverted, that is, if it is set to on (1) it is inverted to off (0), and if it is set to off (0) it is inverted to on (1).

Once inversion of the storage in progress flag has been carried out in step S13, it is next determined whether or not storage of a movie is in progress (S15). Here, determination is based on whether the storage in progress flag, which was inverted in step S13, is set to on or set to off.

If the result of determination in step S15 is that movie storage is in progress, a movie file is created (S19). Movie storage is carried out in step S61, which will be described later, but in this step a movie file for movie storage is created, and preparation so as to be able to store image data of the movie is performed.

On the other hand, if the result of determination is that move storage is not in progress, the movie file is closed (S17). The movie file is closed in this step because the movie button has been pressed and movie shooting is completed. When closing the movie file, the movie file is placed in a state of being capable of being played back by storing a number of frames in a header of the movie file etc., and file writing is completed.

Once the movie file has been closed in step S17, or if a movie file is created in step S19, or if the result of determination in step S11 was that the movie button was not pressed, it is next determined whether or not movie storage is in progress (S31). In this step, similarly to step S15, determination is based on whether the storage in progress flag is on or off.

If the result of determination in step S31 is that movie storage is not in progress, it is next determined whether or not the shutter release button has been pressed down half way, in other words, whether or not the first release switch has changed from an off state to an on state (S33). For this determination, the state of the first release switch that is linked to the shutter release button is detected by the operation member 123, and determination is carried out based on the result of this detection. If the result of detection is that the first release switch has changed from an off state to an on state, the result of determination becomes Yes, while on the other hand if an on state or an off state is maintained the result of determination becomes No.

If the result of determination in step S33 is that the shutter release button has been pressed down half way, then in the case where the first release has transitioned from the off state to the on state an AE/AF operation is executed (S35). Here, the AE processing circuit 111 detects subject brightness based on image data acquired by the image sensor 103, and calculates shutter speed and aperture value etc. for correct exposure based on this subject brightness.

Also, an AF operation is carried out in step S35. Here, the driver 205 moves focus position of the photographing lens 201 by means of the microcomputer 207 inside the interchangeable lens 200, so that a focus evaluation value that has been acquired by the AF processing circuit 113 becomes a peak value. As a result, if the shutter release button is pressed down halfway when movie shooting is not being carried out, focusing of the photographing lens 201 is carried out at that point in time. After that processing advances to step S37.

If the result of determination in step S31 is that there has not been a transition from the shutter release button being off to the first release switch being in an on state, it is next determined whether or not the shutter release button has been pressed down fully, and the second release switch is in an on state (S41). In this step, the state of the second release switch that is linked to the shutter release button is detected by the operation member 123, and determination is carried out based on this result of detection.

If the result of determination in step S41 is that the shutter release button is pressed down fully and that the second release switch has entered an on state, shooting and image processing are carried out (S43). Here, the diaphragm 203 is controlled with the aperture value that was calculated in step S35, and the shutter speed of the mechanical shutter 101 is controlled with the calculated shutter speed. Then, once the exposure time corresponding to the shutter speed has elapsed, image signals are read from the image sensor 103, and RAW data that has been processed by the analog processing circuit 105 and the A/D converter 107 is output to the bus 110.

Also, if shooting is carried out in step S43, image processing is carried out. RAW data that has been acquired by the image sensor 103 is read out, and image processing is carried out by the image processing circuit 109. Also, in a case where an image combination mode has been set, shooting is carried out a plurality of times in accordance with the image combination mode, and image data to be used at the time of image combination is temporarily saved to the storage medium 133 etc. Detailed operation of this shooting and image processing will be described later using FIG. 4 and FIG. 5.

Once shooting and image processing have been carried out, still picture storage is next carried out (S45). Here, image data for a still picture to which image processing has been applied is stored in the storage medium 131. At the time of still picture storage, storage is carried out in a format that has been set. In the event that JPEG has been set, data that has already been subjected to image processing is subjected to JPEG compression by the image compression circuit 115 and stored. Also, in the case of TIFF format, data is converted to RGB data and stored in RGB format. In the case where RAW storage has been set, if combination has been carried out with RAW data that was acquired by shooting, combined RAW data is also stored. A storage destination for the image data may be storage medium 131 within the camera body, or may be storage to an external device via the communication circuit 14.

If the result of determination in step S41 is not that the second release button is not fully pressed, or if the result of determination in step S31 is that movie storage is in progress, next AE is carried out (S51). In the case where determination in previously described step S41 was No, it is a situation where no operation was carried out for the shutter release button, and in this case live view display of step S57, which will described later, is carried out. Also, if the determination in previously described step S31 was Yes, movie storage is in progress. In this step, shutter speed and ISO sensitivity for the electronic shutter of the image sensor 103 in order to carry out live view display or movie shooting at the correct exposure are calculated.

Once AE has been carried out, shooting using the electronic shutter is carried out (S53). Here, the subject image is converted to image data. Specifically, charge storage is performed during an exposure time that is determined by the electronic shutter of the image sensor 103, and image data is acquired by reading out the stored charge once the exposure time has elapsed.

Once shooting using the electronic shutter has been carried out, image processing is carried out on the acquired image data (S55). In this step, basic image processing, such as WB correction, color matrix calculation, gamma conversion, edge enhancement, and noise reduction are carried out by the basic image processing circuit 109b.

If basic image processing has been carried out, live view display is next carried out (S57). In this step, live view display on a display panel 135 is carried out using the image data that was subjected to basic image processing in step S55. Specifically, image data is acquired in step S53, and image processing is carried out, and so update of the live view display is carried out using an image that has been subjected to this processing. A photographer can determine composition and photo opportunity by looking at the live view display.

Once live view display has been carried out in step S57, it is next determined whether or not movie storage is in progress (S59). Here it is determined whether or not the storage in progress flag is on. If the result of this determination is that movie storage is in progress, movie storage is carried out (S61). Here, image data read out from the image sensor 103 is subjected to image processing to give image data for a movie, and stored in a movie file.

If movie storage has been carried out in step S61, if the result of determination in step S59 was not that movie storage is in progress, if still picture storage has been carried out in step S45, or if AE/AF was carried out in step S35, it is next determined whether or not the power supply is off (S37). In this step it is determined whether or not the power supply button of the operation member 123 has been pressed again. If the result of this determination is not power off, processing returns to step S3. On the other hand, if the result of determination is power off, a termination operation of the main flow is executed and then this main flow is terminated.

In this way, in the main flow of the first embodiment of the present invention, it is possible to set an image combination mode etc. (S9), and if an image combination mode has been set shooting is carried out a plurality of times depending on the image combination mode in shooting and image processing (S43), and the combined image data is stored (S45). At the time of image combination, at least some of the image data can being temporarily saved to the storage medium 131 etc.

Next, detailed operation of the shooting and image processing in step S43 will be described using the flowcharts shown in FIG. 4 and FIG. 5. If the flow for shooting and image processing is entered, first appropriate exposure shooting is carried out (S101). Here, shooting is carried out at the exposure conditions that have been calculated in step S35 at the time the shutter release button was pressed down half way. Depending on the shooting mode etc., shooting in this step need not be at an appropriate exposure.

Once appropriate exposure shooting has been carried out, next RAW incorporation is carried out (S103). Shooting in step S101 is a base image, and in order to prioritize image quality data compression is not carried out by the RAW data compression circuit 108 and instead non-compressed RAW image data is incorporated and stored in the SDRAM 127.

Once RAW the incorporation has been carried out, it is next determined whether or not there is HDR combination (S105). It is determined whether or not HDR combination mode has been set as the shooting mode in the camera setting of step S9. HDR combination mode is a mode for generating an image of wider dynamic range than a single image, using a plurality of image data that have been acquired by sequential shooting at different exposure amounts.

If the result of determination in step S105 is HDR combination, exposure amount change is carried out (S111). Exposure amount is sequentially changed to, for example, −1 step (an exposure amount of half compared to the appropriate exposure conditions), and +1 step (an exposure amount of double compared to the appropriate exposure condition) with respect to appropriate exposure conditions that were determined in step S35. Once the exposure amount has been changed, shooting is carried out (S113). Here, shooting is carried out in accordance with exposure amount that was changed in step S111.

Once shooting has been carried out, RAW compression and incorporation is carried out (S115). An image that has been shot with exposure amount changed is not a base image, and so a certain amount of degradation in image quality is permissible. Therefore, in order to make image data volume small, image data that has been read out is subjected to data compression by the RAW data compression circuit 108.

Once Raw compression and incorporation has been carried out, is next determined whether or not shooting has been carried out a specified number of times (S117). Here, it is determined whether or not a number of images that has been set for carrying out HDR combination, for example, a number of taken images besides the base image, has reached 2. If the result of this determination is that the specified number of images has not been reached, step S111 is returned to and shooting for HDR combination continues.

If the result of determination in step S105 is not HDR combination, it is next determined whether or not it is focus stacking (S121). It is determined whether or not focus stacking mode has been set as the shooting mode in the camera setting of step S9. As was described previously, focus stacking mode is a mode for generating an image having a different depth of field to a single image, using a plurality of image data that have been acquired by sequentially shooting by moving the focus lens to different positions.

If the result of determination in step S121 is focus stacking, moving of the focus lens is carried out (S123). Here, instructions so as to cause the photographing lens 201 to be sequentially moved to specified focus positions are sent to the microcomputer 207 within the interchangeable lens 200. As specified positions, for example, it is possible to have positions that are changed ⅛th of a step at a time from the close-up end to the infinity end.

Once focused movement has been carried out, next appropriate exposure shooting is carried out (S125). Here, shooting is carried out by setting exposure amount in accordance with appropriate exposure conditions that were determined in step S35. Once optimal exposure shooting has been carried out, next, similarly to step S115, RAW compression and incorporation are carried out (S127). Here, image data that has been readout is subjected to data compression by the RAW data compression circuit 108.

Once Raw compression and incorporation has been carried out, it is next determined whether or not shooting has been carried out a specified number of times (S129). Here, it is determined whether or not there are a number of images set for carrying out focus stacking, for example, in the event that a number of steps for focus position has been set to ⅛, for example, it is determined whether or not a number of taken images besides a base image has reached 8. If the result of this determination is that the specified number of images has not been reached, step S123 is returned to and shooting for focus stacking continues.

If the result of determination in step S121 is not focus stacking, it is next determined whether or not it is super resolution combination (S131). It is determined whether or not super resolution combination mode has been set as the shooting mode in the camera setting of step S9. Super resolution combination mode is a mode for generating an image that has better resolution than a single photograph using a plurality of image data. Specifically, sequential shooting of a plurality of images is carried out while shifting a sensor (image sensor 103), in the case of sensor vibration correction, or a correction lens, in the case of lens vibration correction, by a specified number of pixels (for example, by a single pixel of the sensor). Once a plurality of image data have been acquired, an image having high resolution is generated that is different to that of a single image, using these image data.

If the result of determination in step S131 is super resolution combination, minute optical axis movement is carried out (S133). Here, in the case of sensor vibration correction, the sensor position is moved minutely within a plane orthogonal to the optical axis, so that the image sensor 103, for example, moves by one pixel. Also, in the case of lens vibration correction, the state of a lens for correction is minutely corrected so that, for example, the optical axis is moved by one pixel on the sensor.

Once minute optical axis movement has been carried out, then, similarly to step S125, appropriate exposure shooting is carried out (S135). Here, shooting is carried out in accordance with appropriate exposure conditions that were determined in step S35. Once appropriate exposure shooting has been carried out, next, similarly to step S115, RAW compression and incorporation are carried out (S137). Here, image data that has been read out is subjected to data compression by the RAW data compression circuit 108.

Once Raw compression and incorporation has been carried out, it is next determined whether or not shooting has been carried out a specified number of times (S139). Here, a specified number of images set for carrying out super resolution combination is, for example, three images besides the base image, namely images that have been offset from the position where the base image was taken to the left by one pixel, below by one pixel, and to the lower left by one pixel, and it is determined whether or not three images have been taken. If the result of this determination is that the specified number of images has not been reached, step S133 is returned to and shooting for super resolution combination continues.

If the result of determination in S117, S129 or S139 is that the predetermined number of images has been reached, next data save is carried out (S141). Raw data that has been read out from the image sensor 103 is stored in the SDRAM 127, either directly, with no compression, or after being compressed. The image combining circuit 109c carries out image combination such as HDR combination using a plurality of image data (RAW data) stored in the SDRAM 127, but at this time, in order to secure a memory region required for image combination in the SDRAM 127, at least some of the image data (RAW data) stored in the SDRAM 127 is saved to the storage medium 131. Detailed operation of this data save will be described later using FIG. 7 and FIG. 8.

Once data save has been carried out, image combination is carried out in step S151 and after. First, similarly to step S105, whether or not it is HDR combination is determined (S151). If the result of this determination is HDR combination, RAW acquisition and expansion are carried out (S153). RAW data for a base image and RAW data for combination images is obtained either from the SDRAM 127 or from a save destination of the storage medium 131. In this case, RAW data for the base image is not compressed, but RAW data for the combination images is compressed, and so expansion processing is carried out on the RAW data for the combination images in the RAW data expansion circuit 109a. The acquired RAW data for the base image and the expanded RAW data for the combination images is stored in a working region of the SDRAM 127.

Once RAW the acquisition and expansion have been carried out, next alignment is carried out (S155). Here, RAW data for the base image and RAW data for the combination images that were acquired instead S153 or read out from the SDRAM 127, and the image combining circuit 109c carries out section by section alignment of the read-out base image and combination images.

Once alignment has been carried out, next HDR combination is carried out (S157). Here, the image combining circuit 109c combines RAW data for combination that has been sequentially shot at different exposure amounts with RAW data for the base image, or, if this is the second or later combination with this repeated processing, with the previous combination result, to generate an image having a wider dynamic range than a single image.

Once HDR combination has been carried out, next, it is determined whether or not combination of a specified number of images has been carried out (S159). Here, it is determined whether or not HDR combination has been carried out for a number of combination images, that is, a number of images that have been taken for HDR combination. If the result of this determination is that the specified number of images has not been reached, step S153 is returned to and HDR combination continues.

If the result of determination in step S151 was not HDR combination, next, similarly to step S121, it is determined whether or not it is focus stacking (S161). If the result of this determination is focus stacking, RAW acquisition and expansion are carried out (S163), similarly to step S153. Next alignment is carried out similarly to step S155 (S165).

Once alignment has been carried out, next focus stacking is carried out (S167). Here, RAW data for combination that has been sequentially shot at different focus positions is combined with RAW data for the base image, or, if this is the second or later combination with this repeated processing, with the previous combination result, to generate an image having a different depth of field to a single image.

Once focus stacking has been carried out, next, it is determined whether or not combination of a specified number of images has been carried out (S169). Here, it is determined whether or not focus stacking has been carried out for a number of combination images, that is, a number of images that have been taken for focus stacking. If the result of this determination is that the specified number of images has not been reached, step S163 is returned to and focus stacking continues.

If the result of determination in step S161 was not focus stacking, next, similarly to step S131, it is determined whether or not it is super resolution combination (S171). If the result of this determination is super resolution combination, RAW acquisition and expansion are carried out (S173), similarly to step S153. Next alignment is carried out (S175) similarly to step S155.

Once alignment has been carried out, next super resolution combination is carried out (S177). Here, RAW data for combination that has been sequentially shot at different positions on the optical axis is combined with RAW data for the base image, or, if this is the second or later combination with this repeated processing, with the previous combination result, to generate an image having a different resolution to a single image.

Once super resolution combination has been carried out, next, it is determined whether or not combination has been carried out for a specified number of images (S179). Here, it is determined whether or not super resolution combination has been carried out for a number of combination images, that is, a number of images that have been taken for super resolution combination. If the result of this determination is that the specified number of images has not been reached, step S173 is returned to and super resolution combination continues.

If the result of determination in steps S159, S169 or S179 is the specified number of images, basic image processing is carried out (S181). Here, the basic image processing circuit 109b carries out basic image processing, specifically image processing such as WB correction, color matrix computation, gamma conversion, edge enhancement, noise reduction etc., on RAW data that was combined in steps S157, S167 and S177. Once basic image processing has been carried out, the shooting and image processing flow is completed, and the originating processing flow is returned to. Various image processing parameters, such as white balance gain, color matrix and gamma etc. used in the basic image processing may be changed for each combination mode.

In this manner, in the flow for shooting and image processing of this embodiment, if shooting is carried out in line with a set shooting mode (combination mode) (S101-S139), RAW data is temporarily saved to the storage medium 131. As a result, a memory region for image combination is secured in the SDRAM 127, and image combination is carried out using this secured memory region. It is therefor possible to acquire many images for image combination, and it is possible to improve image quality of the combined image.

With this embodiment, image data for combination is stored in the SDRAM 127 after having been compressed in the RAW data compression circuit 108 (S115, S127 or S137), and expanded in the RAW data expansion circuit 109a at the time of image combination (S153, S163 or S173). However, image data for combination is also stored uncompressed in the SDRAM 127, and may be used directly at the time of image combination. In this case, a greater memory capacity is required, but it is possible to shorten the time required for compression and expansion.

Figure 6:
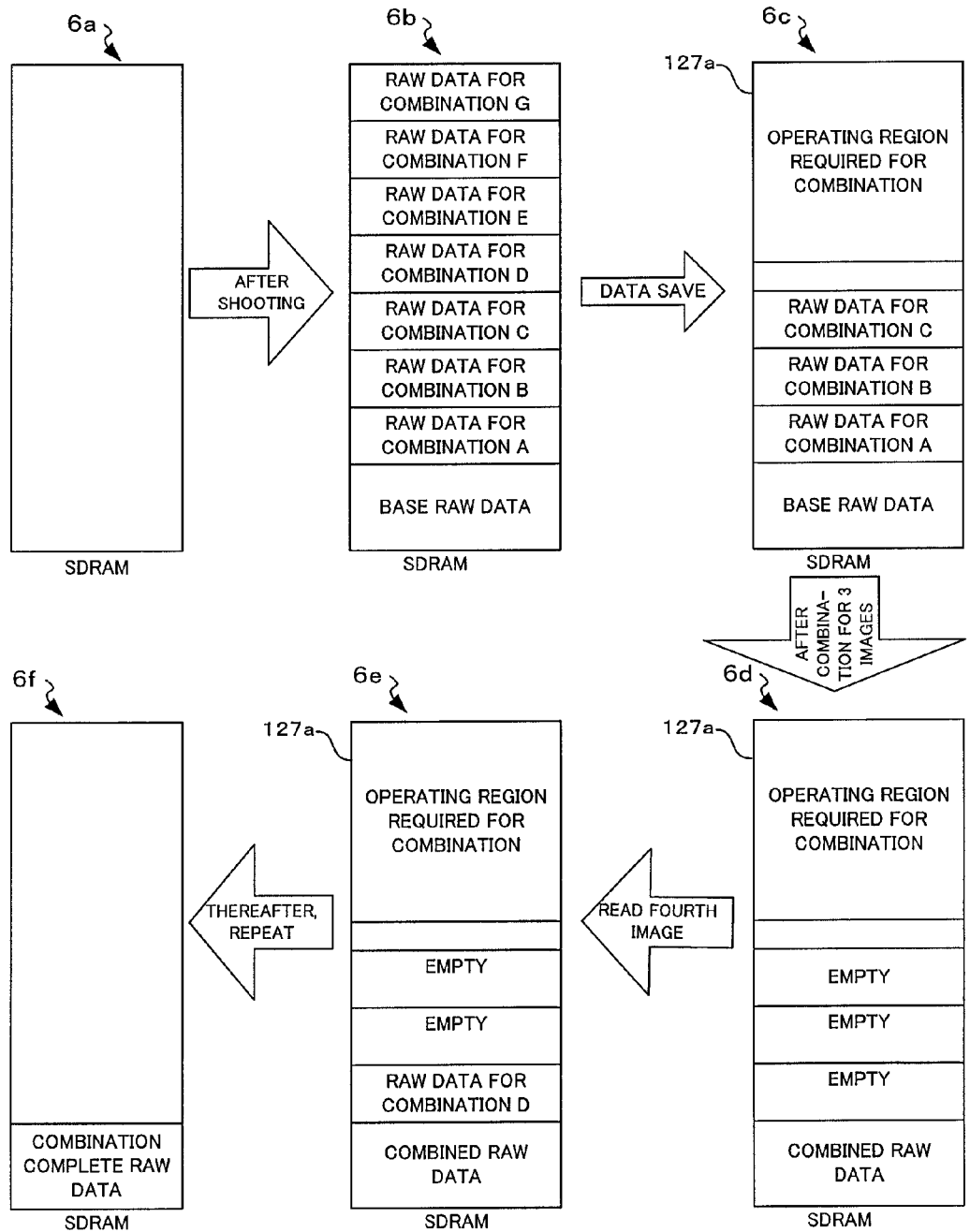
FIG. 6 is a drawing for describing operation for data save from an SDRAM, in the camera of the first embodiment of the present invention.

Next, data save will be described using FIG. 6 to FIG. 8. FIG. 6 explains storage states for data within the SDRAM 127. In FIG. 6, program regions etc. have been omitted, and only data portions are shown.

In FIG. 6 state 6a shows a data storage state for a data region before shooting, with RAW data not being stored. State 6b shows a storage state for RAW data within the SDRAM 127 after shooting. With the example shown in state 6b, a total of 8 data items are stored, namely base RAW data, and RAW data for combination A to RAW data for combination G. At the time of shooting (S113, S125 and S135 in FIG. 4), completing shooting of images for combination in as short a time as possible makes it possible to prevent a combination failure due to subject blur etc.

State 6c shows a state where some of the RAW data stored in the SDRAM 127 has been subjected to data save in the storage medium 131. Specifically, by data saving the RAW data for combination D-G that has been stored in the SDRAM 127 to the storage medium 131, a working region 127a required for combination is freed up. If the working region 127a is freed up, the image combining circuit 109c executes combination processing, in accordance with a shooting mode (combination mode) that has been set, in the working region 127a. Saving of RAW data for combination may be carried out in parallel with processing for shooting the RAW data for combination.

State 6d shows a state where image combination has been carried out by the image combining circuit 109c using base RAW data and RAW data for combination A-C. In this state, combined RAW data that has been generated using the base RAW data and the RAW data for combination A-C are stored in the region where the base RAW data was stored.

State 6e shows a state where RAW data for combination D that had been saved to the storage medium 131 is returned to an empty region of the SDRAM 127. In this state, the image combining circuit 109c carries out combination processing for combined RAW data and RAW data for combination D, and replaces the combined RAW data after combination in the working region 127a. Returning the RAW data for combination that had been saved in the storage medium 131, and the combination processing, may be processed in time sequence, or they may both be processed in parallel. Also, with the example shown in state diagram 6e, only the RAW data for combination D has been returned to the empty region, but is also possible to return a plurality of RAW data for combination, such as RAW data for combination E, F etc., and not just combined RAW data D.

State 6f shows a state where image combination has been completed. Specifically, in state 6e, once image combination has been repeated by sequentially returning RAW data for combination from the storage medium 131 to the SDRAM 127 and image combination has been carried out using all RAW data for combination, combination complete RAW data is generated, as shown in state 6f.

Figure 7:
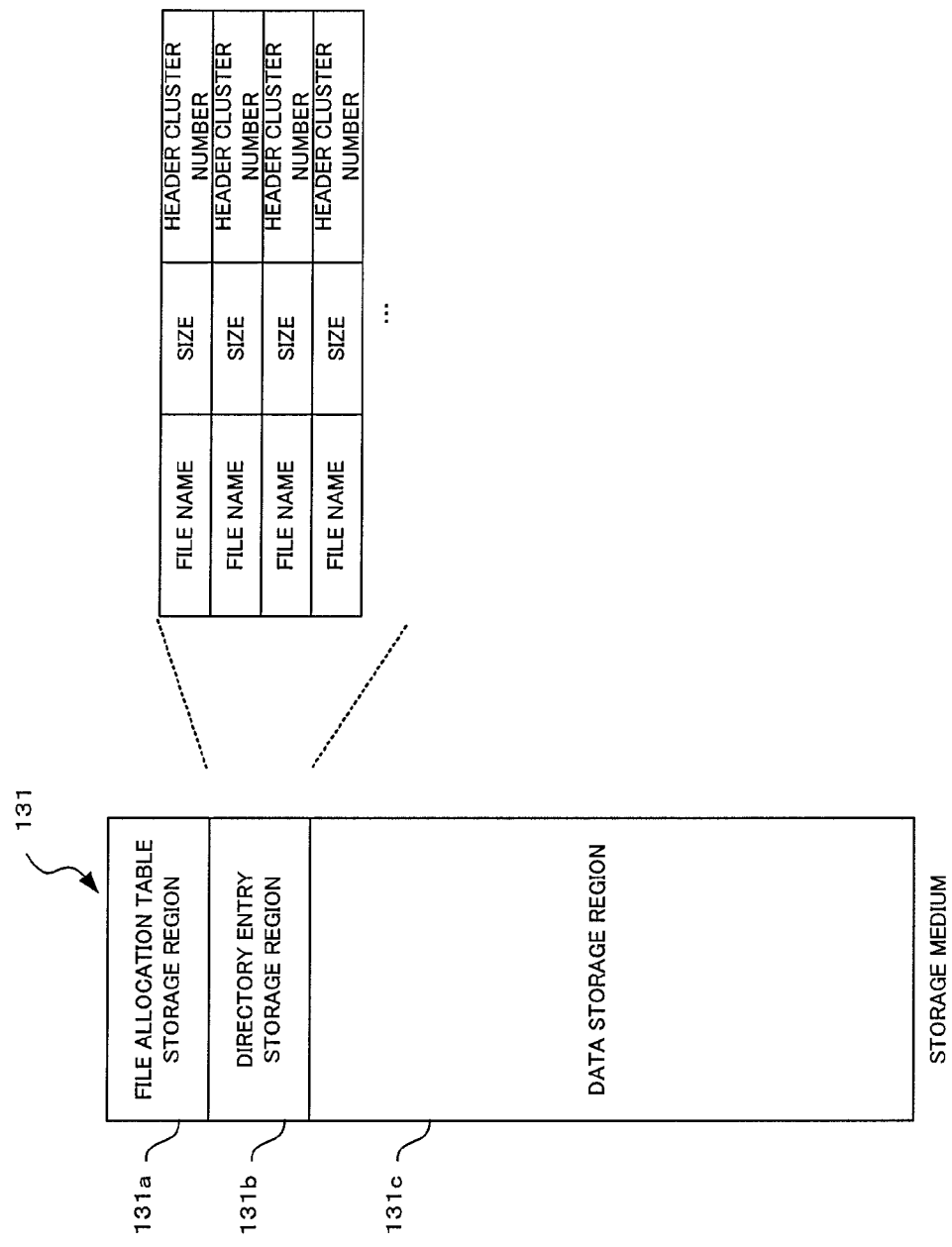
FIG. 7 is a drawing for describing a data structure in a storage medium, in the camera of the first embodiment of the present invention.

FIG. 7 is a drawing showing data storage regions of the storage medium 131. As shown in FIG. 7, as storage regions of the storage medium 131 there are a file allocation table (FAT) region 131a, a directory entry storage region 131b and a data storage region 131c.

The file allocation table (FAT) region 131a is a region for managing by storing in which order one or more clusters is being used. Also, the directory entry storage region 131b is a region showing what type of file has been stored. The data storage region 131c is a region for storage of data, with data being stored for each cluster.

Data indicating how a cluster, which is a unit for storage, is used for a data storage region is stored in the FAT. Since the maximum capacity for storage in a single cluster is set, if data cannot be stored in a single cluster, an empty cluster is searched for, and information indicating that storage is continuing to the empty cluster is stored in the FAT. In the event that there is no continuation to other clusters, a numerical value indicating that there is no continuation is stored. Cluster association information indicating which cluster data uses is called a cluster chain. A header of a cluster chain can be identified by a header cluster number for a file of a directory entry.

When data is stored in the data region 131c, unused clusters are detected by searching within the FAT and data is written. If data amount is large and cannot all be written to that cluster, the next empty cluster is searched for, the fact that data continues to the empty cluster is stored in the FAT, and data is written to the empty cluster. If this processing is repeated and it is possible to write all of the data, data indicating that no further clusters are joined is written to the FAT (END in FIG. 8). After that, file name information, data size, and head cluster number are stored in the directory entry.

When data is read from the data storage region 131c, size and head cluster is acquired from the file name stored in the directory entry storage region 131b. If the head cluster is known, data corresponding to the head cluster is read out from the data storage region 131c, and if the size has not been reached reading is repeated by acquiring the next cluster from the FAT.

Generally, because it takes time to write to the storage medium, data of the FAT storage region and the directory entry storage region is temporarily read to SDRAM within a camera, then necessary editing is carried out and data written to the storage medium.

Figure 8:
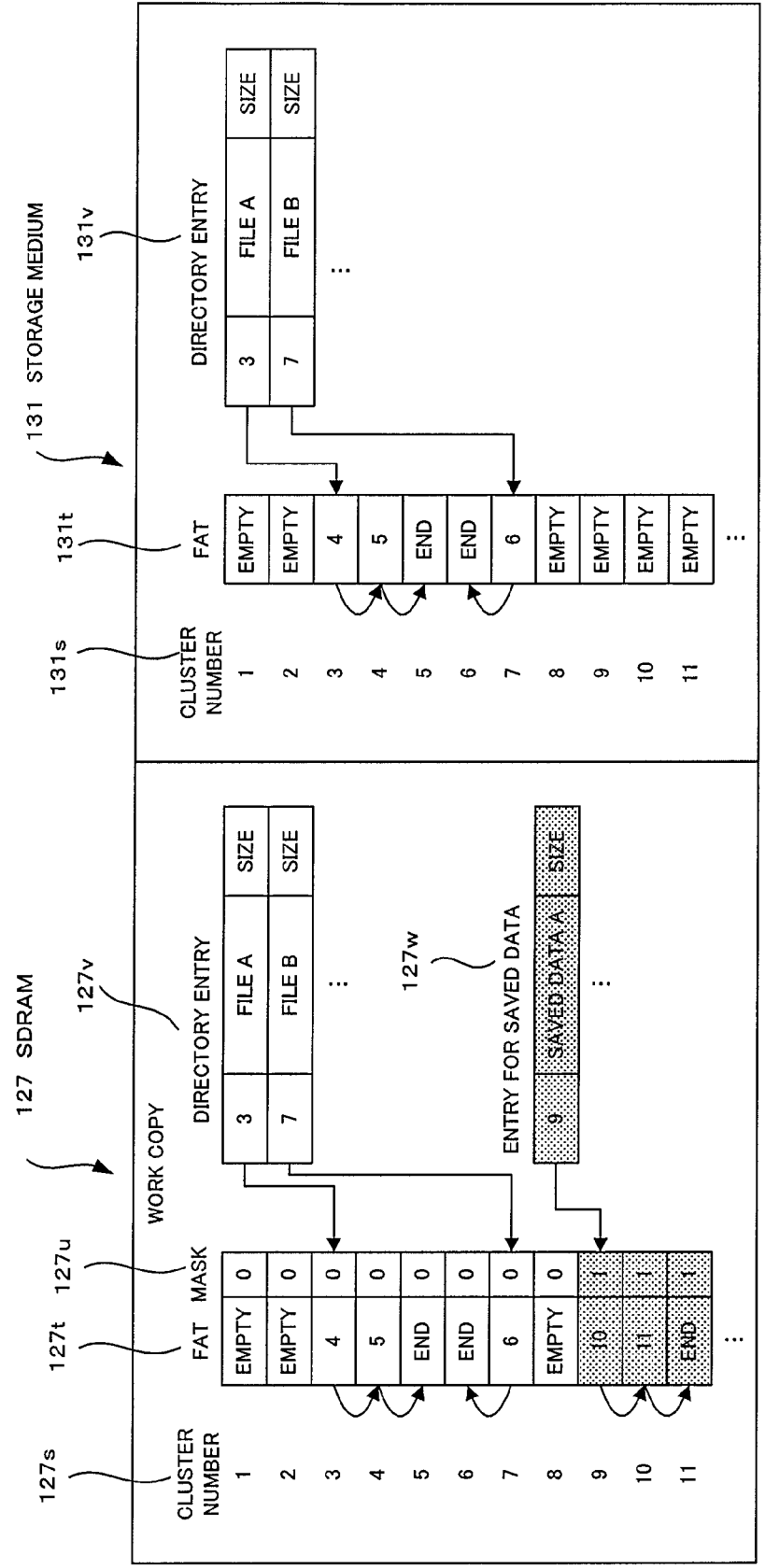
FIG. 8 is a drawing for describing a data save operation to a storage medium, in the camera of the first embodiment of the present invention.

With this embodiment, as shown in FIG. 8, when data to be saved is written in the storage medium, a cluster chain is stored in a FAT 127t (stored in SDRAM 127) within the camera, similarly to the related art, but in addition to this storage, management information for identifying a cluster chain for save data is stored. With the example shown in FIG. 8, saved data is stored in cluster numbers 9-11 of the data storage region of the storage medium 131, and as management information "1" is stored as a mask bit 127u. "0" is stored as a mask bit 127u in clusters in which saved data is not stored.

Also, cluster number where data is stored, file name, and size are stored in directory entry 127v within the SDRAM 127. However, data that has been saved is stored to be managed not in a directory entry but in a saved data entry region 127w. In the storage medium 131, the FAT stores a cluster, in which save data is stored, in directory entry 131v as an empty cluster, and does not store an entry for saved data.

When reading out data saved in the storage medium 131, a head cluster (cluster 9 in the example of FIG. 8) in which necessary data is stored is acquired from an entry 127w for saved data, and data up to END is read from the storage medium 131 while referencing the FAT 127t within SDRAM. With the example shown in FIG. 8, data stored in clusters 9, 10 and 11 is read.

In this way, management information for the saved data is stored in the SDRAM 127, but management information is not stored in the storage medium 131 even though data is saved. As a result, a file in which saved data has been stored appears to no longer exist according to the management information for the storage medium 131. Specifically, information relating to a file in which save data has been stored is not stored in the directory 131v or the FAT 131t of the storage medium 131, which means that it is possible to avoid a problem where files that the user is unaware of remain in the storage medium 131, even if there is abnormal close down (the camera battery running out or the storage medium being removed etc.).

Figure 4:
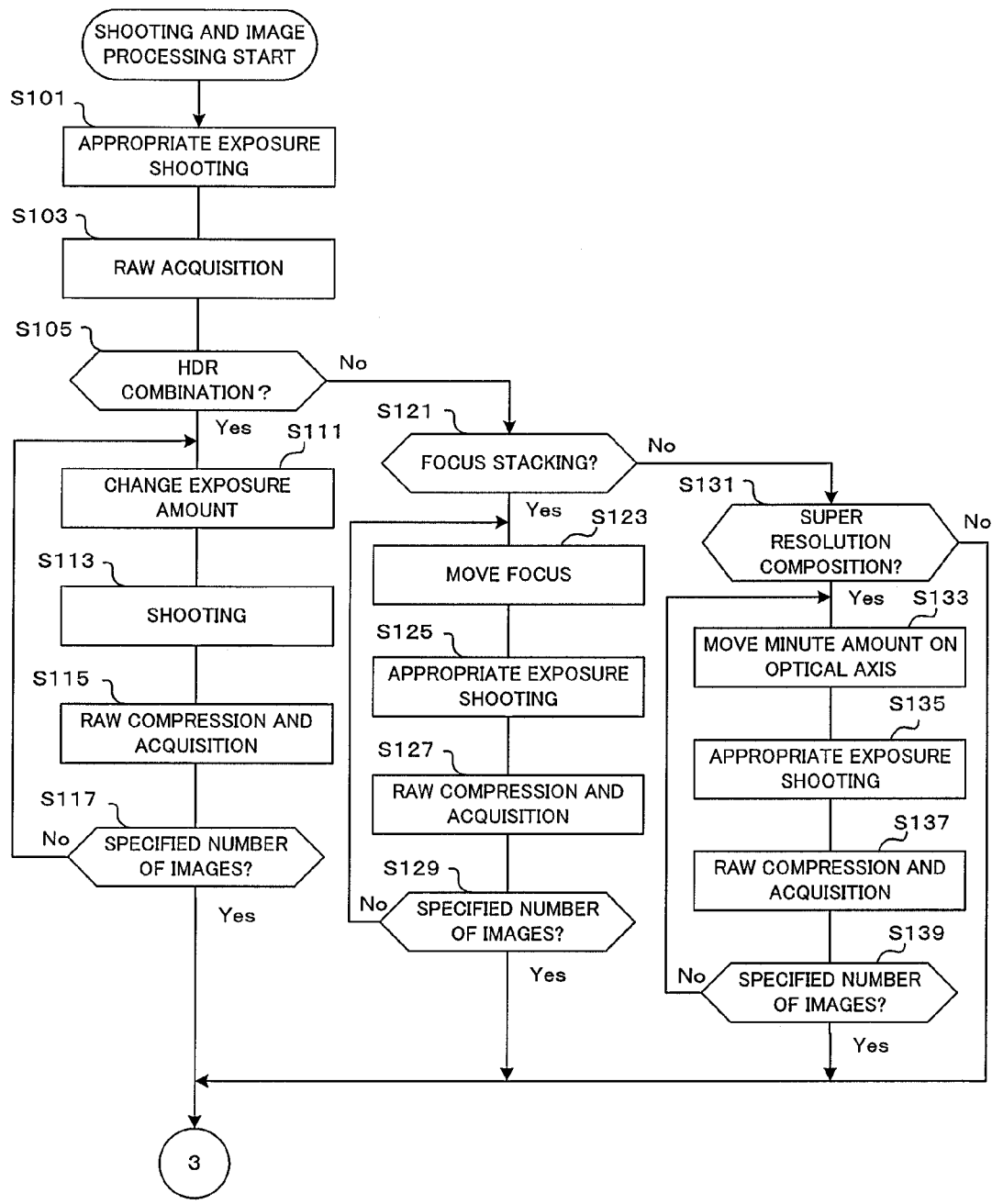
FIG. 4 is a flowchart showing operation of imaging and image processing for the camera of the first embodiment of the present invention.
Figure 5:
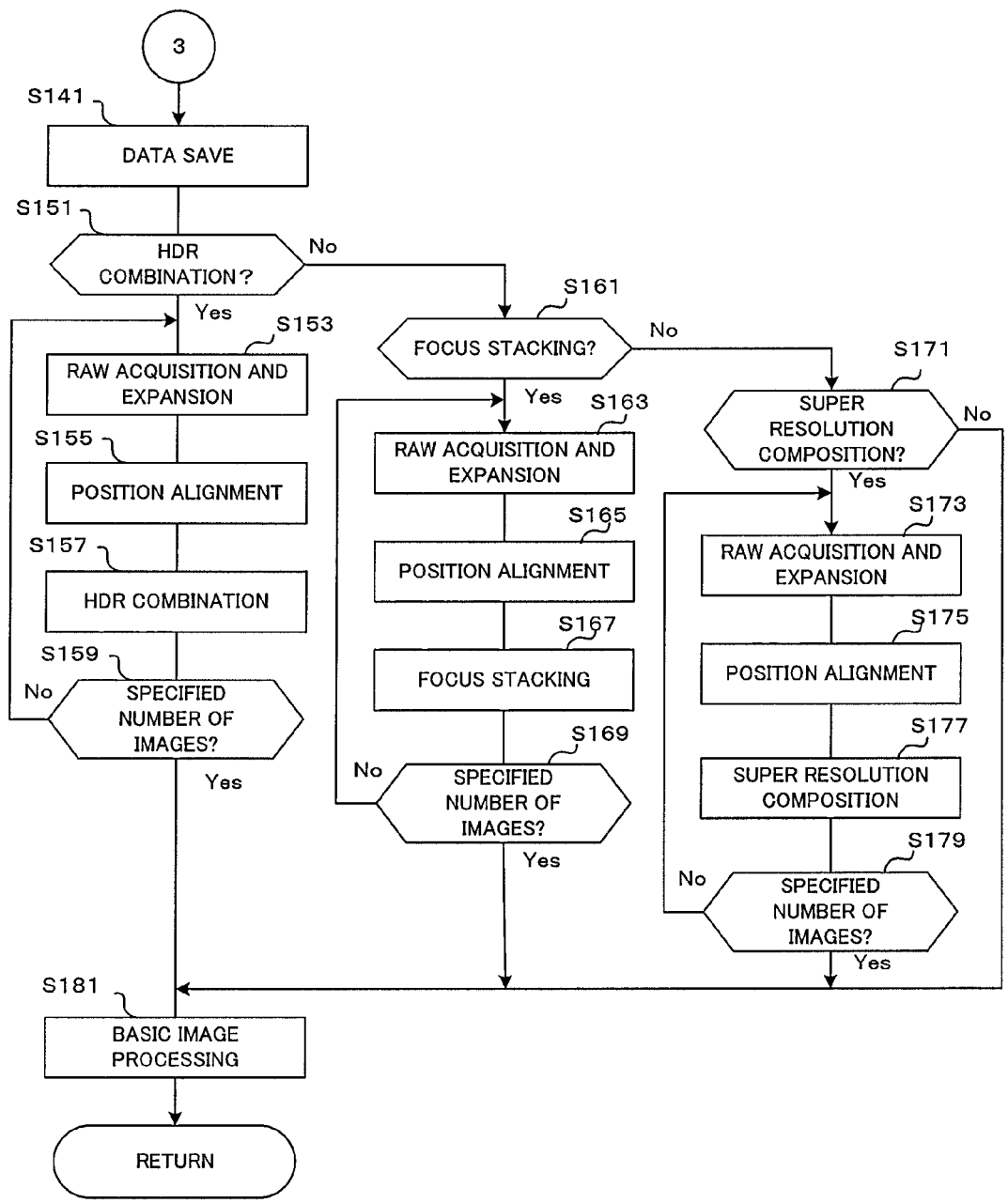
FIG. 5 is a flowchart showing operation of imaging and image processing for the camera of the first embodiment of the present invention.

In this embodiment, a plurality of image data are temporarily stored in SDRAM 127 by carrying out shooting a plurality of times (S43 in FIG. 3, S101-S139 in FIG. 4), and when carrying out image combination using the temporarily saved plurality of image data (S151-S179 in FIG. 5), at least some of the plurality of image data are saved to storage medium 131 (S141 in FIG. 5), and the saved data are returned to SDRAM 127 and used at the time of image combination (refer to S153, S163 and S173 in FIG. 5, and state 6e in FIG. 6). As a result, it is possible to perform image combination using a lot of image data even if capacity of the SDRAM 127 is small, and it is possible to improve image quality of a combined image.

Also, when saving image data to the storage medium 131, management information for save (portions of the saved data entry 127w and the FAT 127t having 1 set in a mask bit 127u) is stored within the SDRAM 127, but not stored in the storage medium 131. As a result, even in the case where the camera has been closed down abnormally, and saved data has been returned to SDRAM 127, since management information for saved data is not stored in the storage medium 131, saved data is not actually preserved.

Figure 9:
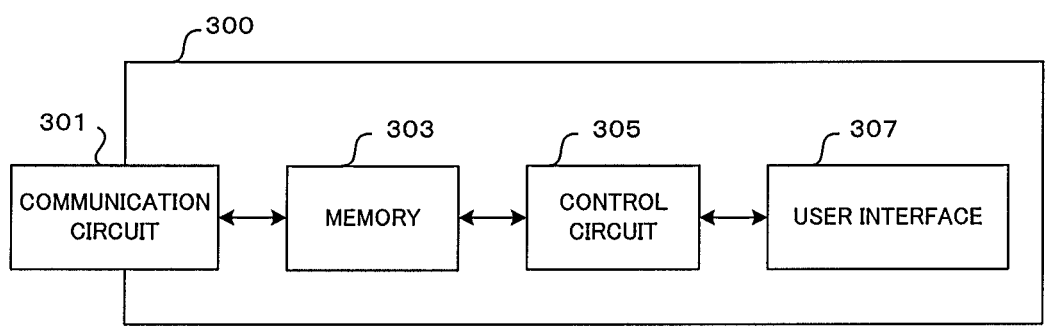
FIG. 9 is a block diagram showing the structure of external devices that can communicate with the camera of one embodiment of the present invention.

Next, a second embodiment of the present invention will be described using FIG. 9 to FIG. 11. In the first invention, since direct access is possible to the file system of the storage medium 131 within the camera, it was possible to control management information for saved data (saved data entry 127w and FAT 127t, and information of the mask bits 127u). Conversely, with the second embodiment, the storage medium is an external data storage device connected via the communication circuit 14. For a device that is external to the camera, the camera cannot directly access files, and it is not possible for the camera body to control management information for saved data. Therefore, if a connection between the camera and an external data storage device is lost, saved data will be automatically deleted after a fixed time. Specifically, data receipt, transfer, and file deletion are executed at the external data storage device side.

The structure at the camera side of this embodiment is the same as the camera of the first embodiment that was shown in FIG. 1. Also, the external data storage device is in a PC, smartphone, network storage etc. One example of the structure of an external data storage device will be described using FIG. 9.

The external storage device 300 comprises a communication circuit 301, memory 303, a control circuit 305, and a user interface 307. The communication circuit 301 can carry out exchange of data with the communication circuit 14 within the camera body 100 using wired or wireless communication.

The memory 303 is an electrically rewritable volatile memory or non-volatile memory, and can store image data that has been input via the communication circuit 301. Program code etc. for controlling the external data storage device is also stored. This memory 303 has the same storage regions as the storage medium 131 was shown in FIG. 7 and FIG. 8.

The control circuit 305 carries out overall control of the external storage device 300 in accordance with program code stored in the memory 303. The user interface 307 has a display section and an operating section, and displays information to the user as well as being input with instructions from the user. The external storage device 300 is simply memory, and the user interface 307 need not be provided as long as control by means of communication etc. is possible.

Next, operation of this embodiment will be described using FIG. 10 and FIG. 11. Main operation of the camera is similar to the flowcharts shown in FIG. 2 and FIG. 3, and so detailed description is omitted. However, in step S45 of FIG. 3 still picture image data to be stored in the external data storage device 300 which will be described later is transmitted without designating a deletion time, which will be described later, and stored in the external data storage device 300 as a file in a format that will not be deleted after the elapse of a specified time. Also, operation for shooting and image processing in step S43 of FIG. 3 is different in that within the flowcharts shown in FIG. 4 and FIG. 5, FIG. 5 is replaced with FIG. 10 (the flowchart shown in FIG. 4 is the same). Description will therefore concentrate on points of difference, using FIG. 10.

Figure 10:
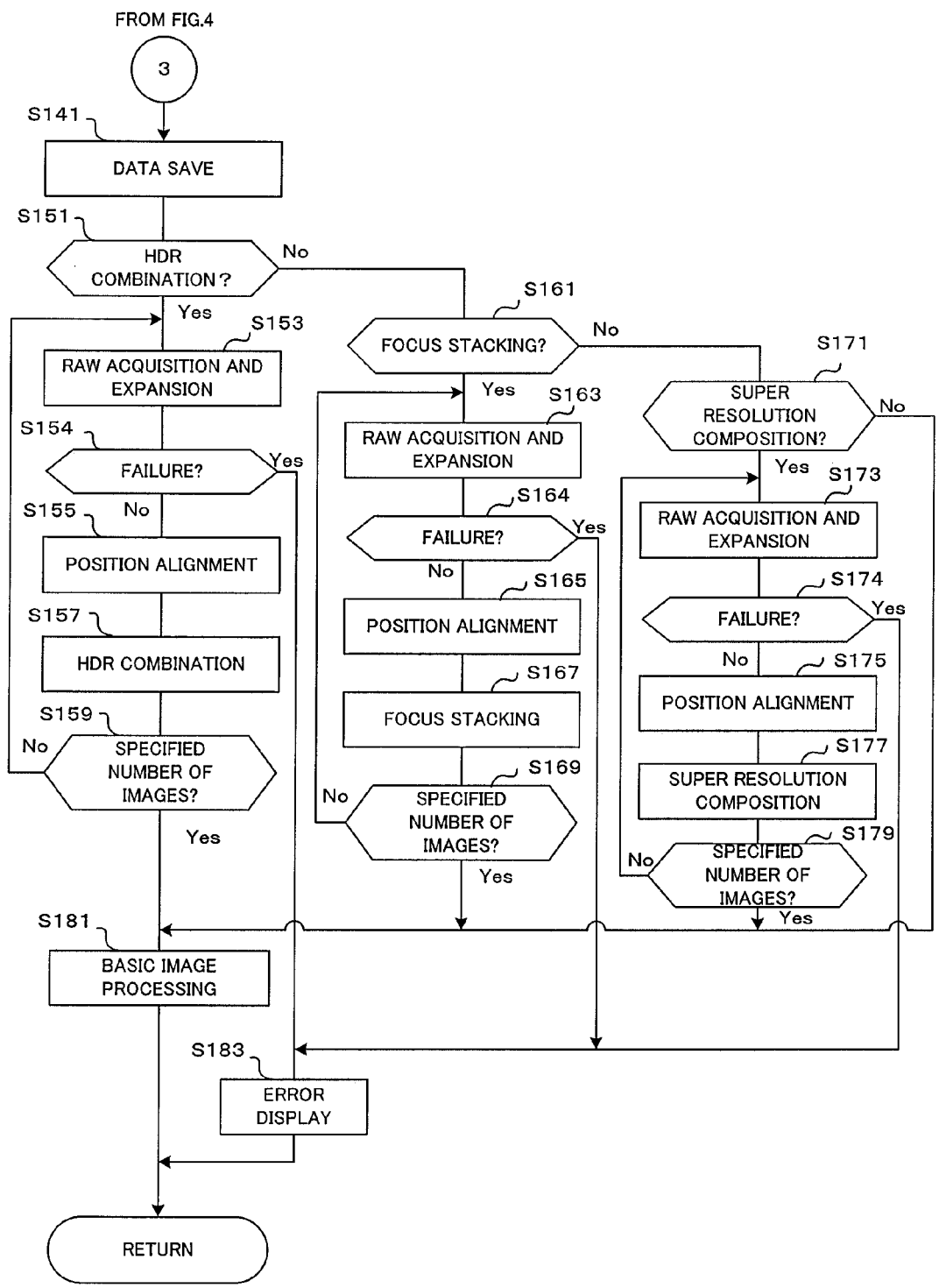
FIG. 10 is a flowchart showing operation of imaging and image processing for a camera of a second embodiment of the present invention.

The flowchart shown in FIG. 10 only has steps S154, S164 and S174 added to the flowchart shown in FIG. 5, and other steps are the same as in the flowchart of FIG. 5. Description will therefore concentrate on points of difference.

In this embodiment, if the operation for shooting and image processing is commenced, first, in S101-S139 in FIG. 4, shooting is carried out and a plurality of image data are acquired. Once the plurality of image data have been acquired, data save is carried out (S141). Here, temporary data is saved to memory 303 within the external data storage device 300, and a memory region required for combination is secured. Specifically, data is saved to the external data storage device, for example, storage on a network or a smart phone or PC, via the communication circuit 14 and communication circuit 301.

When carrying out data save in step S141, after communication has been lost between the camera body 100 and the external data storage device 300, a time until it is acceptable to delete the saved data is designated, and transmitted in conjunction with information on this deletion time. The external data storage device 300 stores the deletion time that has been input from the camera body 100 in the memory 303. With the example shown in FIG. 10 and FIG. 11, when saved data is received, a timeout until restoration in the case where communication has been lost is made 30 seconds, and so the deletion time is made a time that is greater than this timeout time (30 seconds) (for example, 40 seconds). If less than the timeout time is designated, a condition will arise where the file will not exist even with restoration. In a case where processing time for combination is long, then it is preferable to change the deletion time in accordance with the order of raw data used in combination processing etc. in consideration of this length of time.

Once data save has been carried out in step S141, it is determined whether or not it is HDR combination (S151), and if the result of this determination is HDR combination RAW acquisition and expansion is carried out (S153). Once RAW acquisition and expansion has been carried out it is next determined whether or not there is a failure (S154). When communicating with the external data storage device 300, compared to the case of carrying out data saved to the storage medium 131 within the camera body 100, it is more likely that communication errors will arise. With this embodiment, therefore, whether a communication error has occurred is determined using whether or not RAW acquisition and expansion has been successful.

If the determination as to whether or not there has been a failure in step S154 is that at the time of RAW acquisition it was not possible to communicate with the external data storage device 300 saved data was transmitted to, there is a wait for a specified time (for example, 30 seconds), and if a communication path cannot be established a failure is determined.

If the result of determination in step S154 was that there was a failure, error display is carried out (S183). In this step, characters, icons or the like representing that there has been a failure in combination are displayed on the display panel 135, and the fact that there has been a failure in communication is conveyed to the photographer. Once error display has been carried out the originating flow is returned to. On the other hand, if the result of detection in step S154 is that there is not an error, processing advances to step S155 and, similarly to the first embodiment, HDR combination is carried out.

If focus stacking has been determined in step S161, then similarly to step S154, whether or not there has been a failure is determined based on whether a timeout time has elapsed in a state where it is not possible to establish a communication path, and in the event of a failure error display is carried out (S183), and once error display has been carried out the originating flow is returned to. On the other hand, if the result of detection in step S164 is that there is not an error, processing advances to step S165 and, similarly to the first embodiment, focus stacking is carried out.

If super resolution combination has been determined in step S171, then similarly to step S154, whether or not there has been a failure is determined based on whether a timeout time has elapsed in a state where it is not possible to establish a communication path, and in the event of a failure error display is carried out (S183), and once error display has been carried out the originating flow is returned to. On the other hand, if the result of detection in step S174 is that there is not an error, processing advances to step S175 and, similarly to the first embodiment, super resolution combination is carried out.

In this way, in the flow for shooting and image processing on this embodiments, similarly to the first embodiment, since data save is carried out for image combination, it is possible to acquire image data of large capacity even if the capacity of the SDRAM 127 is small. It is therefore possible to improve image quality of a combined image.

Next, operation of data save for the external data storage device 300 will be described using FIG. 11. If execution of a program based on main flow for the external data storage device shown in FIG. 11 is started, it is first determined whether or not communication is possible (S201). Here, whether or not it is a state where communication is possible is checked. If there is wireless communication or wired communication, it is determined whether or not the communication path has been established. Even in a case where the memory 303 is arranged inside the same device, this method can be adopted, and in such a case it is checked whether or not camera functions are active.

If the result of determination in step S201 is a state in which communication is possible, it is next determined whether or not data is received (S203). Here it is determined whether or not it was possible to receive data from the camera body 100. In the case where the memory is within the same device, it is determined whether or not there has been a data save request.

If the result of determination in step S203 is that data has been received, next save data is received (S205). Once data receipt has been carried out, next file storage is carried out (S207). Here, saved data is stored in the memory 303 within the external data storage device 300. Any file name may be used as long as it is not duplicated.

Once file storage is being carried out, it is next determined whether or not there is a deletion time (S209). In the data save step of S141 in FIG. 10, a deletion time determined in accordance with timeout time until restoration in the case where communication is lost (40 seconds with the example of FIG. 10) is transmitted from the camera body 100 to the external data storage device 300. In this step it is determined whether or not a deletion time has been transmitted from the camera body 100. If the result of determination in step S209 is that there is a deletion time, the deletion time is stored (S211).

If the result of determination in step S203 is not data receipt, it is determined whether or not there was a data request (S213). In the event that the camera body 100 uses data that has been saved to the memory 303 of the external data storage device 300 when carrying out image combination, a data request is transmitted to the external data storage device 300. In this step it is determined whether or not there is this data request signal.

If the result of determination in step S213 is that that was a data request, data transfer is carried out (S215). Here, RAW data for combination that is the subject of the data request is read out, and transmitted to the camera body 100.

Once data transfer has been carried out, file deletion is carried out (S217). Here, the RAW data for combination that has been read out and transmitted to the camera body 100 is deleted from the memory 303. If file deletion has been carried out, the deletion time that was output accompanying the RAW data for combination is deleted (S219).

If the result of determination in step S201 is not a state where communication is possible, the deletion time is checked (S221). Since a deletion time is stored in accordance with a number of saved data, it is confirmed, for each deletion time, whether or not that time has elapsed since entering the state where communication was not possible.

Once the deletion time has been checked, it is determined whether or not a designated deletion time has elapsed (S223). In this step, it is determined whether or not the designated deletion time has elapsed since entering the state where communication was not possible.

If the result of determination in step S223 is that the designated time has elapsed, file deletion is carried out (S225). Since the designated time has elapsed, there is a state where communication is not possible, and all RAW data for combination that has been stored in the memory 303 is deleted. Once file deletion has been carried out in step S225, next the deletion time is deleted (S227).

If the deletion time has been deleted in step S227, if the result of determination in step S223 is that the designated time has not elapsed, if the deletion time has been deleted in step S219, if the result of determination in step S213 was that there was no data request, if the result of determination in step S209 was that there was no deletion time, or if a deletion time has been stored in step S211, it is determined whether or not processing is complete (S229). As completion conditions there are the user instructing completion using any operation member etc., or the power supply of an external device being turned off or restarted etc. If the result of this determination is not completion, processing returns to step S201 and operation continues, while if the result of determination is completion operation of the main flow is completed.

In this way, with the second embodiment, since it is not possible to control the file system of the memory 303 at the camera body 100 side, in the event that the link to the external data storage device 300 is lost RAW data for combination within the external data storage device 300 is automatically deleted after a specified time (after the deletion time).

For example, continuous shooting of a plurality of images (for example 8 images) is carried out in the camera body 100, some (4) of these taken images are stored in SDRAM 127 within the camera body 100, and the remaining data (for the remaining 4 images) is saved to the memory 303 within the external data storage device 300. At the time of transmitting saved data from the camera body 100 to the external data storage device 300, a deletion time is also transmitted, and using this deletion time, in the event that communication is terminated due to abnormal close down of the camera body 100 etc., the external data storage device 300 deletes the saved data.

As has been described above, each of the embodiments of the present invention comprises an image data acquisition circuit (for example, image sensor 103) for acquiring image data, a temporary memory (for example, SDRAM 127) for temporarily storing image data, an image processing circuit (for example, image combining circuit 109c) for subjecting the temporarily stored image data to image processing, a storage medium (for example, storage medium 131, memory 303) capable of storing at least some saved data of the temporarily stored image data, management information memory (for example, entry 127w for saved data) for storing management information for management of the saved data, and a control circuit (for example, microcomputer 121) for carrying out management of the saved data using the management information when storing the saved data in the storage medium. As a result, even in a case where the imaging device has been closed down abnormally, or situations such as where communication between storage medium and the imaging device has been interrupted, unnecessary files are not preserved.

Also, with the embodiments of the present invention, the control circuit (for example, microcomputer 121) stores saved data in a storage medium when carrying out image processing using the image processing circuit, and at that time management information, showing storage position in the storage medium where the saved data is stored, is stored in management information memory (for example entry 127w for saved data in the SDRAM 127), but management information is not stored in the storage medium (for example, storage medium 131) (refer, for example, to FIG. 8). Specifically, there are no administrative files in the storage medium (for example, storage medium 131, memory 303).

Also, in the embodiments of the present invention, the imaging device has a communication circuit (for example, communication circuit 14) for transmitting saved data from temporary memory (for example, SDRAM 127) to storage medium (for example, memory 303), and together with saved data, deletion time information (for example, S141 in FIG. 10) is transmitted to a control circuit (for example, control circuit 305) at the storage medium side via the communication circuit. As a result, when the storage device is external to the imaging device, even in a case where the imaging device has been closed down abnormally, or in situations such as where connection or communication between the storage medium and the imaging device has been interrupted, unnecessary files are not preserved.

Figure 11:
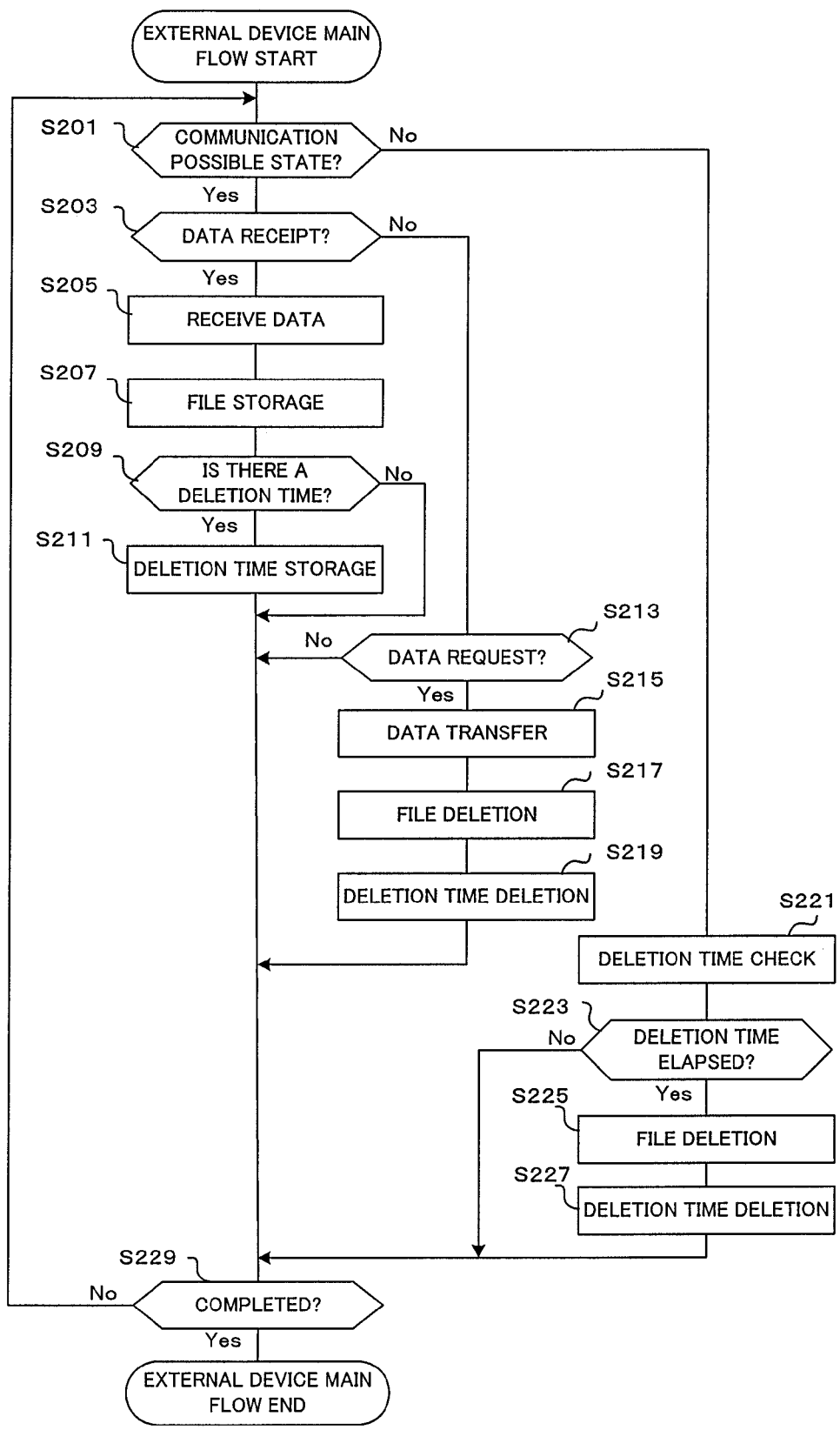
FIG. 11 is a flowchart showing main operation of external devices for the second embodiment of the present invention.

Also, with the embodiments of the present invention the control circuit (for example, control circuit 305) deletes saved data that has been temporarily stored in the storage medium (for example, memory 303) after the lapse of the deletion time (for example, S225 in FIG. 11). As a result, even in a case where the imaging device has been closed down abnormally, or in situations such as where connection or communication between the storage medium and the imaging device has been interrupted, since files are deleted they are not preserved.

Also, with the embodiments of the present invention, the image data storage device (for example, image data storage device 300) stores image data that has been output from the imaging device (for example, camera body 100). There is also provided a data acquisition circuit for acquiring saved data together with deletion time via a communication circuit (for example, communication circuit 301), a storage medium that can store the saved data (for example, memory 303), a management information memory for storing deletion time (for example, memory 303, or may be separate from the memory 303), and a control circuit (for example, control circuit 305) for deleting saved data in the event that the deletion time has elapsed since a communication path via the communications circuit was lost. As a result, even in a case where the imaging device has been closed down abnormally, or in situations such as where connection or communication between the storage medium and the imaging device has been interrupted, unnecessary files are not preserved in the image data storage device.

Also, each of the embodiments of the present invention comprises an imaging circuit (for example, image sensor 103) for forming a subject image and acquiring image data, a memory (for example, SDRAM 127) for temporarily storing image data, an image combining circuit (for example, image combining circuit 109c) for combining a plurality of image data and generating combined image data, a storage control circuit (for example, microcomputer 121) for controlling data storage, and a control circuit (for example, microcomputer 121) for controlling the imaging device, the control circuit instructing the imaging circuit so as to consecutively acquire a plurality of image data (for example, S101-S139 in FIG. 4), instructing the storage control circuit to store at least some of the plurality of image data using a first storage system (for example the storage format for the storage medium 131 in FIG. 8), and instructing the image combining circuit so as to combine a plurality of image data, and instructing the storage control circuit to store the image data that has been generated by the image combining circuit using a second storage system (for example, the storage format for the SDRAM 127 in FIG. 8). As a result, even in a case where the imaging device has been closed down abnormally, or situations such as where connection or communication between the storage medium and the imaging device has been interrupted, unnecessary files are not preserved. The first storage system is a system for storing image data such that it is not seen as a file after at least a specified time has elapsed, while the second storage system is a system for storing image data so that it exists as a file after at least a specified time has elapsed.

Also, each of the embodiments of the present invention has non-volatile memory (for example, storage medium 131), and the storage control circuit controls data storage to the non-volatile memory such that with a first storage system data is stored to a cluster for data storage of the nonvolatile memory and information is not stored as a file in a management region (for example, the storage system for the storage medium 131 of FIG. 8), and with a second storage system data is stored in a cluster for data storage of the non-volatile memory and management information is stored as a file in a management region. As a result, even in a case where the imaging device has been closed down abnormally, or situations such as where connection or communication between the storage medium and the imaging device has been interrupted, unnecessary files are not preserved.

Also, the embodiments of the present invention have a file deletion control circuit. With the first storage system a deletion time until deletion after abnormality detection is specified and data is stored (for example, S211 in FIG. 11), while with the second storage system data is stored without specifying a deletion time, and the file deletion control circuit deletes a file when a deletion time has elapsed, after an abnormality has been detected (S225 in FIG. 11). As a result, even in a case where the imaging device has been closed down abnormally, or situations such as where connection or communication between the storage medium and the imaging device has been interrupted, unnecessary files are not preserved.

Also, with each embodiment of the present invention, image data is acquired (for example, S101, S113, S125, S135 in FIG. 4), image data is temporarily stored (for example, S103, S115, S127, S137 in FIG. 4 and state 6b in FIG. 6), at least some of the temporarily stored image data is saved as saved data (for example, S141 in FIG. 5 and states 6c-6e in FIG. 6), management information for managing the saved data is stored (for example, entry 127w for saved data in FIG. 8), saved data is managed using the management information when storing saved data to a storage medium (for example, FIG. 8), and image processing is carried out using saved data that has been saved (for example, states 6c-6e in FIG. 6). As a result, even in a case where the imaging device has been closed down abnormally, or situations such as where connection or communication between the storage medium and the imaging device has been interrupted, unnecessary files are not preserved.

Also, with the embodiments of the present invention, saved data is acquired together with a deletion time (for example, S205 in FIG. 11), the saved data and the deletion time are stored (for example, S207 and S211 in FIG. 11), and in the event that the deletion time has elapsed since a communication path for input of saved data was lost, the saved data is deleted (for example, S223 and S225 in FIG. 11). As a result, in situations such as where communication between the imaging device and an image data storage device has been interrupted, unnecessary files are not preserved.

Also, with the first embodiment of the present invention, the storage medium 131 is arranged within the camera body 100, but as long as file management for an external storage medium can be carried out by the camera body 100, the location of the storage medium 131 may be external to the camera body. Also, with the second embodiment of the present invention, the memory 303 is arranged outside the camera body 100, but as long as it is possible to carry out file management of an external storage medium (memory 303) within the camera body 100, the memory 303 may be within the camera body. Also, the file management method in which management information relating to the saved data is not stored, that was described in the first embodiment of the present invention, may also be carried out with the external data storage device 300 that was described in the second embodiment of the present invention.

Also, with each of the embodiments of the present invention, shooting is carried out a plurality of times, and image combination is carried out using a variety of image data acquired at that time, but it is also possible to carryout image combination by dividing single image data acquired from single shooting into a plurality of sections. Also, image combination has been performed using a plurality of RAW data, but image combination is not limited to RAW data, and may be performed after temporarily converting to JPEG data etc. Also, while image combination has been performed using a plurality of image data, processing is not limited to image combination, and image processing to process a plurality of image data may also be carried out.

Further, with these embodiments, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any event, it is possible to adopt the present invention as long as a device carries out image processing using a plurality of image data.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image data acquisition circuit for acquiring image data,
a temporary storage for temporarily storing the image data,
an image processing circuit for subjecting the image data that has been temporarily stored to image processing,
a storage medium that can store at least some saved data of the image data that has been temporarily stored,
a management information storage for storing management information for managing the saved data, and
a control circuit for, when the saved data is stored in the storage medium, carrying out management of the saved data using the management information,
wherein, when the saved data is stored in the storage medium, the control circuit carries out storage using a first storage method in which management information of the storage medium is not updated, and when the image data that has been subject to image processing by the image processing circuit is stored in the storage medium, the control circuit carries out storage using a second storage method in which management information that has been stored in the storage medium is updated.

2. The imaging device of claim 1, wherein
when the saved data is stored in the storage medium using the first storage method, the control circuit stores management information, showing the storage location at which the same data has been stored in the storage medium, in a management information storage.

3. The imaging device of claim 1, further comprising:
a communication circuit for transmitting the saved data from the temporary storage to the storage medium,
wherein when the saved data is stored in the storage medium using the first storage method,
deletion time information is transmitted via the communication circuit to the control circuit at the storage medium side.

4. The imaging device of claim 3, wherein:
the control circuit deletes the saved data that has been temporarily stored in the storage medium after the deletion time has elapsed.

5. The imaging device of claim 1,
wherein the image processing circuit includes an image combination circuit for combining a plurality of image data and generating combined image data, and
wherein
the control circuit instructs the imaging circuit to continuously acquire a plurality of image data, instructs the storage control circuit to store at least some of the plurality of image data using a first storage system, instructs the image combination circuit to combine the plurality of image data, and instructs the storage control circuit to store the image data that has been combined by the image combination circuit using a second storage system.

6. The imaging device of claim 5, wherein:
with the first storage system image data is stored so as not to be shown as a file after at least a specified time has elapsed, and
with the second storage system image data is stored so as to exist as a file after at least a specified time has elapsed.

7. The imaging device of claim 5, wherein the storage medium is
a non-volatile memory.

8. The imaging device of claim 1 wherein the temporary storage is an SDRAM and the storage medium is a non-volatile storage medium.

9. The imaging device of claim 1 wherein the management information stored is associated with file allocation table information.

10. The imaging device of claim 1 wherein the temporary storage includes a first file allocation table, at least one first directory entry and at least one entry for the saved data,
wherein the storage medium includes a second file allocation table and at least one second directory entry, and
wherein the management information stored is associated with information of the first file allocation table, and the second file allocation table does not include entries for the saved data.

11. An imaging method comprising:
acquiring image data;
temporarily storing the image data;
saving, on a storage medium, at least some of the image data that has been temporarily stored as saved data;
storing management information for managing the saved data;
when the saved data is stored in the storage medium, carrying out management of the saved data using the management information;
when the saved data is stored in the storage medium, carrying out storage using a first storage method in which management information of the storage medium is not updated;
when image processing is performed using the saved data that has been saved and the image data is stored in the storage medium, carrying out storage using a second storage method that controls such that management information that has been stored in the storage medium is updated; and
carrying out image processing using the saved data that has been saved.

12. A method for managing imaging data stored on a memory and on a storage medium, and used in an image process for combining the imaging data, the method comprising:

temporarily storing the imaging data on the memory;

saving at least some of the image data on the storage medium thereby defining a first subset of unsaved image data and a second subset of saved image data;

storing first management information on the memory, wherein the first management information (1) distinguishes the first subset of unsaved image data from the second subset of saved image data and (2) identifies one or more locations on the recording medium of the second subset of saved image data; and storing second management information on the storage medium, wherein the second management information does not identify the one or more locations on the recording medium of the second subset of saved image data.

* * * * *